US011699110B2

(12) United States Patent
Buttolo et al.

(10) Patent No.: US 11,699,110 B2
(45) Date of Patent: Jul. 11, 2023

(54) VEHICLE RIDE SHARING SYSTEM AND METHOD USING SMART MODULES

(71) Applicant: Ford Global Technologies, LLC, Dearborn, MI (US)

(72) Inventors: Pietro Buttolo, Dearborn Heights, MI (US); Stuart C. Salter, White Lake, MI (US); James Stewart Rankin, II, Novi, MI (US); James J. Surman, Clinton Township, MI (US); Annette Lynn Huebner, Highland, MI (US); Jeffrey A. Wallace, Walled Lake, MI (US); Cornel Lewis Gardner, Romulus, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 72 days.

(21) Appl. No.: 17/240,018

(22) Filed: Apr. 26, 2021

(65) Prior Publication Data
US 2021/0241188 A1    Aug. 5, 2021

Related U.S. Application Data

(63) Continuation of application No. 15/227,940, filed on Aug. 3, 2016, now Pat. No. 11,599,833.

(51) Int. Cl.
*G06Q 10/02* (2012.01)
*G06Q 10/0631* (2023.01)
(Continued)

(52) U.S. Cl.
CPC ......... *G06Q 10/02* (2013.01); *G01C 21/3438* (2013.01); *G06Q 10/0631* (2013.01); *G06Q 10/109* (2013.01)

(58) Field of Classification Search
CPC ................. G06Q 10/02; G06Q 10/109; G06Q 10/0631; G01C 21/3438
See application file for complete search history.

(56) References Cited

U.S. PATENT DOCUMENTS

2011/0137773 A1\*  6/2011  Davis, III .......... G01G 19/4142
340/5.82
2013/0238167 A1\*  9/2013  Stanfield ................. E05B 81/56
701/2

(Continued)

FOREIGN PATENT DOCUMENTS

CN           104094178 A      10/2014

OTHER PUBLICATIONS

Bilong Shen, Yan Huang, and Ying Zhao. 2016. Dynamic ridesharing. SIGSPATIAL Special 7, Nov. 3, 2015, 3-10. https://doi.org/10.1145/2876480.2876483 (Year: 2015).\*

(Continued)

*Primary Examiner* — Jeff Zimmerman
*Assistant Examiner* — Wayne S. Murray
(74) *Attorney, Agent, or Firm* — Joseph Zane; Eversheds Sutherland (US) LLP

(57) ABSTRACT

A vehicle sharing system includes a vehicle having interior transceiver modules associated with different passenger seating areas and a vehicle computing system (VCS) including a processor and a memory in communication with the modules and programmed to detect occupancy status of each seating area based on signals from the modules and to communicate the occupancy statuses to a remote server to facilitate scheduling of ride-sharing passengers for a specified seating area of the vehicle. The reserved seating location may be used to align the seating location/door with a passenger during pick-up, adjust vehicle accessory settings associated with the reserved seating location, and activate a (Continued)

visual indicator to direct the passenger to the assigned/reserved seating location.

18 Claims, 5 Drawing Sheets

(51) Int. Cl.
*G01C 21/34* (2006.01)
*G06Q 10/109* (2023.01)

(56) References Cited

U.S. PATENT DOCUMENTS

| | | | |
|---|---|---|---|
| 2015/0006072 A1* | 1/2015 | Goldberg | G06Q 50/30 |
| | | | 705/5 |
| 2015/0149042 A1* | 5/2015 | Cooper | B60R 25/245 |
| | | | 701/48 |
| 2016/0332535 A1* | 11/2016 | Bradley | E05F 15/70 |
| 2016/0349067 A1* | 12/2016 | Fowe | G01C 21/343 |
| 2017/0228667 A1* | 8/2017 | Duschl | G06Q 10/025 |
| 2017/0285642 A1* | 10/2017 | Rander | B60N 2/0244 |
| 2017/0294130 A1* | 10/2017 | Donnelly | H04W 12/50 |
| 2017/0316696 A1* | 11/2017 | Bartel | G06Q 10/02 |

OTHER PUBLICATIONS

Chinese Office Action dated Oct. 10, 2022.

* cited by examiner

VEHICLE RIDE SHARING SYSTEM AND METHOD USING SMART MODULES

CROSS REFERENCE TO RELATED APPLICATIONS

The present disclosure claims priority to, the benefit of, and is a continuation of U.S. patent application Ser. No. 15/227,940, filed on Aug. 3, 2016, entitled "Vehicle Ride Sharing System and Method using Smart Modules", which is hereby incorporated by reference herein in its entirety.

TECHNICAL FIELD

Aspects of the disclosure relate to vehicle sharing systems and methods including a vehicle having smart modules associated with vehicle seating locations for use in selecting, scheduling and configuring ride-sharing vehicles and for managing rider pick-up and drop-off.

BACKGROUND

Ride sharing and carpooling are becoming more popular as technology enables operators and riders to more easily communicate availability and pricing for transportation. For example, riders may use a ride-sharing service having an associated app to schedule and pay for a ride such as those provided by UBER, LYFT, etc., or may use a more informal carpooling arrangement facilitated by a ride-sharing app that allows drivers and passengers to share vehicle and travel costs (e.g. BLA BLA CAR, ZIMRIDE, etc.). In the foreseeable future, people will be able to schedule an autonomous vehicle pick-up and drop-off using a personal mobile device (smartphone, tablet, computer, wearable, etc.).

SUMMARY

In various embodiments, a vehicle sharing system includes a vehicle having interior transceiver modules associated with different passenger seating areas and a vehicle computing system (VCS) including a processor and a memory in communication with the modules and programmed to detect occupancy status of each seating area based on signals from the modules and to communicate the occupancy statuses to a remote server to facilitate scheduling of ride-sharing passengers for a specified seating area of the vehicle. The vehicle may include a visual indicator associated with each of the passenger seating areas with the VCS programmed to activate the visual indicator that is associated with a reserved passenger seating area in response to the vehicle approaching a pick-up location associated with the reserved passenger seating area. The visual indicator may include a video display and the VCS may be programmed to transmit a passenger name and associated destination to the video display. In one or more embodiments, the visual indicator includes a vehicle interior light that may be illuminated using a color or pattern to direct a passenger to a reserved seating location. The VCS may be configured to transmit a message for receipt by a passenger mobile device associated with an occupied passenger seating area in response to approaching a drop-off location associated with the occupied passenger seating area. The VCS may be configured to receive passenger preference settings from the remote server associated with a passenger pick-up reservation for a designated passenger seating area.

Embodiments may also include a VCS programmed to control at least one vehicle accessory associated with the pick-up reservation for the designated passenger seating area based on the received passenger preference settings. The VCS may control a vehicle accessory associated with a reserved seating area prior to arrival at a scheduled pick-up location in response to received passenger preference settings for the reserved seating area. The VCS may be programmed to verify a passenger identity for a reserved seating area based on communication with a passenger mobile device, and to control at least one of a vehicle lock and a vehicle door in response to verifying the passenger identity. In at least one embodiment, the VCS is programmed to communicate an available occupancy status for a passenger seating area to the remote server in response to detecting a passenger exiting the vehicle based on signals received from the modules. The vehicle modules may be implemented using BLUETOOTH LOW ENERGY (BLE) modules or transceivers using similar communication strategies to determine or identify a occupied or open status for a passenger seating location.

In one or more embodiments, a vehicle may include a VCS programmed to position the vehicle to align a reserved passenger seating area with a passenger scheduled for pick-up and located outside the vehicle in response to triangulation of signals received from a passenger mobile device by at least two BLE modules associated with one or more passenger seating locations. The VCS may be programmed to unlock a cargo area in response to arriving at a passenger destination based on detecting luggage in the cargo area using the modules if the luggage is associated with the passenger destination. The VCS may also be programmed to unlock the cargo area in response to detecting an encrypted handshake with a passenger personal device upon arrival at a passenger pick-up location.

Embodiments may also include a method for controlling a ride-sharing vehicle that may include controlling, by a vehicle processor, a vehicle accessory associated with an individually reservable passenger seating location in response to receiving a reservation for the seating location having associated accessory setting preferences and a scheduled passenger pick-up location such that the settings of the vehicle accessory are changed according to the preferences prior to the vehicle arriving at the pick-up location. The vehicle accessory may include at least one of vehicle heating, interior lighting, a seat heater, a seat cooler, and a seat positioner. The vehicle may include a plurality of BLE modules with at least one module associated with each reservable passenger seating location and configured to communicate with a passenger mobile device. The method may include transmitting a reservable passenger seating location availability signal to a remote server in response to a passenger exiting the vehicle as detected based on signals received from the passenger mobile device by at least two of the modules. The method may also include activating, by the vehicle processor, a visual indicator associated with the reservable passenger seating location assigned to the reservation prior to arriving at the scheduled passenger pick-up location.

In at least one embodiment, a non-transitory storage medium having stored instructions executable by a vehicle processor includes instructions for receiving a reservation for a seating location of a ride-sharing vehicle including a pick-up location, destination, and preferred accessory settings, controlling at least one vehicle accessory associated with the seating location based on the preferred accessory settings prior to or upon arrival at the pick-up location, and aligning the available seating location with a passenger location upon the arrival. The storage medium may also include instructions for detecting the passenger location based on signals received from at least two transceiver modules within the vehicle communicating with a personal device of the passenger.

Embodiments according to the present disclosure may provide one or more advantages. For example, one or more embodiments provide an integrated ride-sharing system and method that provides new features for both operator-driven and autonomous vehicles, such as determining approach, boarding, and departure of passengers, reserving a particular seating location for a passenger, and providing signaling or alerts to indicate assigned/reserved seating locations, for example. One or more embodiments may also use passenger preferences for vehicle equipment or features to book/reserve a vehicle and transmit one or more preferences to the booked vehicle for customized seating location settings prior to boarding the vehicle by the passenger. Various embodiments may detect luggage and align a vehicle arrival location or stopping point to align a cargo area for loading of luggage, or boarding a passenger. A passenger mobile device may provide alerts or notifications of an approaching destination and presence of passenger luggage in the vehicle.

The above advantages and other advantages and features associated with various embodiments will be readily apparent to those of ordinary skill in the art from the following detailed description when taken in connection with the accompanying drawings.

DETAILED DESCRIPTION

Figure 1:
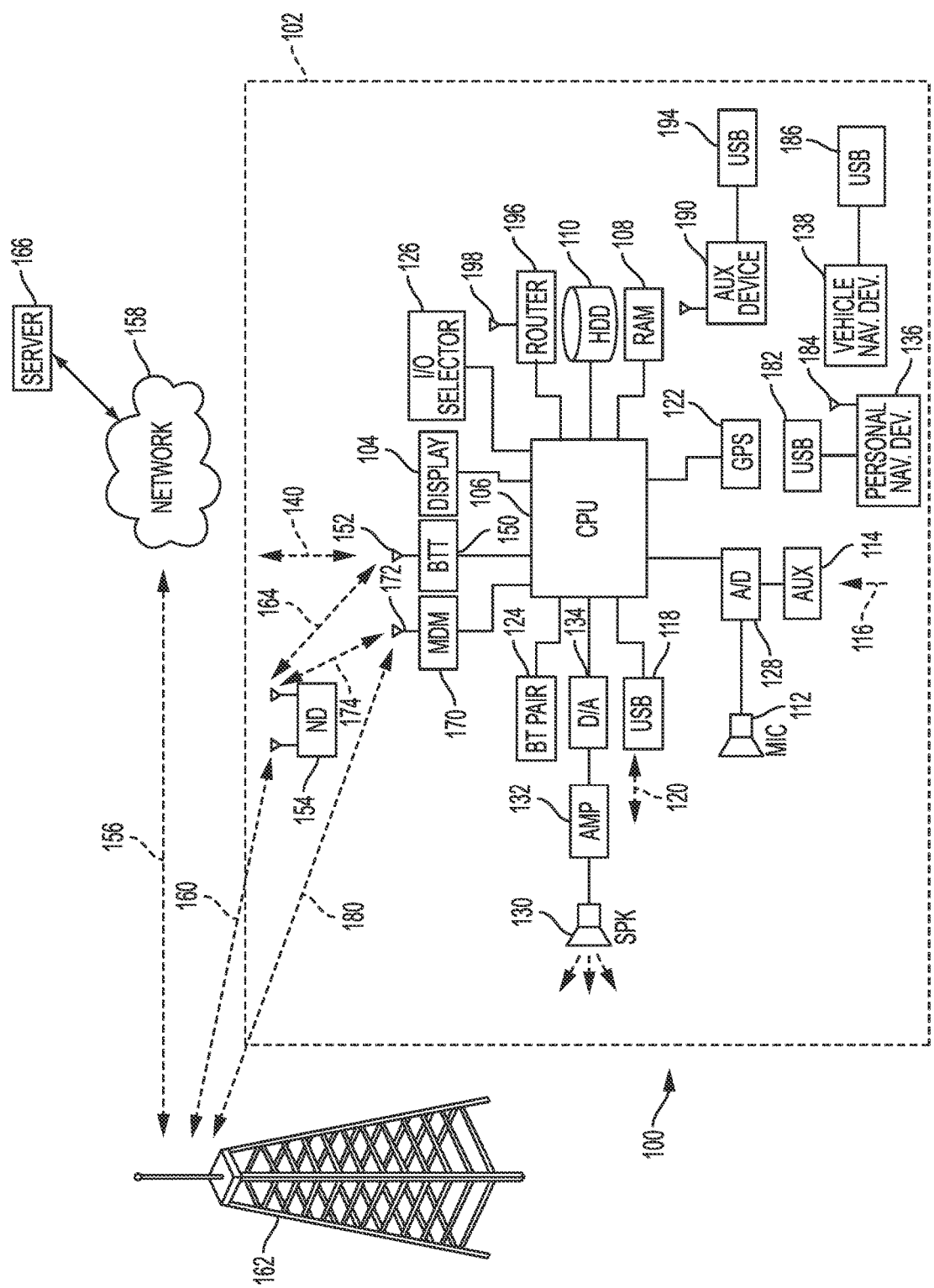
FIG. 1 is a block diagram illustrating a ride-sharing system having a vehicle computing and telematics system configured to reserve and configure accessories for individual passenger seating areas according to a representative embodiment.

As required, detailed embodiments are disclosed herein; however, it is to be understood that the disclosed embodiments are merely representative and the claimed subject matter may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter.

Vehicles may be shared among multiple passengers, particularly along well-traveled routes. Current ride-sharing strategies generally do not recognize various issues related to sharing a vehicle with multiple passengers that may be traveling to different destinations having at least a portion of a route in common. For example, available ride-sharing strategies do not notify potential passengers when a passenger is boarding the vehicle, or that a previously available seating area or pod has been occupied. Similarly, current strategies do not facilitate reserving specific seating areas to accommodate passengers traveling together, or to optimize logistics of loading and unloading passengers and/or luggage. Likewise, reserved or assigned seating locations are not clearly communicated to boarding passengers, and passengers may not have the ability to communicate preferred vehicle equipment or settings for a desired vehicle or seating area.

As described in greater detail herein, various embodiments of this disclosure may leverage a smart module vehicle framework having vehicle interior components enhanced with a communication device, such as BLUETOOTH Low Energy (BLE). Leveraging the signal strength of multiple BLEs and a personal device, such as a smart phone or wearable having an internal gyro and accelerometer, the vehicle system may use reciprocal triangulation to determine whether the personal device is located outside or inside the vehicle, whether the personal device is moving or stationary, and the seating position or area in which the personal device is located. The personal device may identify vehicle interior modules associated with a particular seating location, and may be able to control various vehicle settings for that area. Additionally, interior components may also be plug-and-play such that their interface is discovered in real-time, with a single application on the personal device capable of controlling any vehicle. The passenger preferences may be collected over time and stored on the personal device, in the vehicle computing system, and/or on a remote server.

In one or more embodiments, a stored list of vehicle preferences may be displayed on the personal device of a passenger when booking a ride. The passenger may confirm the preferences so that a remote server can select an appropriate available vehicle, reserve a seat or seating location, and transfer the preferences to the vehicle with an associated scheduled time to apply the preferences so that the vehicle seating location(s) may be configured prior to, or at the time of, the passenger boarding the vehicle. A vehicle may be partitioned into separate spaces for privacy and security to accommodate individual passengers. Individual autonomous vehicles or smaller individual pods may be connected in route to form a connected vehicle or convoy for better energy efficiency.

Embodiments may also include boarding a ride-sharing vehicle employing smart modules that provide reciprocal triangulation allowing the vehicle to stop with an assigned/reserved seating location at a passenger loading position of a waiting passenger. For example, if a specific seating area has been reserved, the vehicle may stop with the corresponding door (or other vehicle entrance) aligned with the passenger. Interior or exterior lights may be illuminated or flashing in a pattern to identify the reserved/assigned seating location(s) for the passenger. For vehicles equipped with individual displays associated with particular seating locations, the display at the seating area may display the passenger name and route/destination. In at least one embodiment, the passenger personal device may use augmented reality to display an overlay of the vehicle indicating the assigned/reserved seating arrangement, the selected route, and other pertinent information/instructions. If luggage (which may also be equipped with BLE or similar technology) is detected, the vehicle may stop at a position presenting the cargo area to the passenger rather than a boarding door. The cargo and/or boarding door may automatically unlock and/or open after an encrypted handshake with the personal device.

Various embodiments of the disclosure include notifying or alerting a passenger in a ride-sharing vehicle to prepare for departure as the vehicle approaches the passenger's destination. In at least one embodiment, the passenger personal device may be notified to display information pertinent to a subsequent portion of travel or activities. The BLE triangulation may be used to notify the vehicle that the passenger has left the vehicle. The vehicle may also wait for triangulation of any tagged luggage or cargo indicating that the luggage or cargo has also been removed from the vehicle. The passenger may be reminded of any luggage placed in the cargo area if the vehicle detects that the passenger is moving away from the vehicle/luggage by a predetermined distance or for a predetermined time, for example. The vacated seating area may then be marked as available for another passenger/route. All this happens completely transparent to the user.

FIG. 1 illustrates an example block topology for a vehicle based computing system 100 (VCS) for a vehicle 102 of a vehicle sharing system according to a representative embodiment. An example of such a vehicle-based computing system 100 is the SYNC system manufactured by THE FORD MOTOR COMPANY. A vehicle enabled with a vehicle-based computing system may contain a visual front end interface 104 located in the vehicle. One or more users may be able to interact with interface 104, for example, using a touch sensitive screen. In another illustrative embodiment, the interaction occurs through button presses or spoken dialog processed by automatic speech recognition and speech synthesis systems, or through a connected personal device.

In the illustrative embodiment shown in FIG. 1, a processor 106 controls at least some portion of the operation of the vehicle-based computing system. Provided within the vehicle, the processor allows onboard processing of commands and routines. As described in greater detail below with reference to FIGS. 2-4, processor 106 may perform various algorithms or functions associated with detecting position of a passenger within a particular seating area, reserving an available seating area for a passenger pick-up, and controlling one or more vehicle accessories or components associated with a reserved passenger seating area prior to, or upon arrival at a passenger pick-up location. Further, the processor is connected to various types of non-transitory or tangible computer program products or storage media implementing both temporary or non-persistent storage 108 and persistent storage 110. In this illustrative embodiment, the non-persistent or temporary storage is implemented by random access memory (RAM) and the persistent storage is implemented by a non-transitory computer program product or medium such as a hard disk drive (HDD), flash drive, or flash memory. In general, persistent memory or storage can include all forms of memory or storage that maintain data when a computer or other device is powered down. This includes, but is not limited to, HDDs, CDs, DVDs, magnetic tapes, solid state drives, portable USB drives and any other suitable form of persistent memory.

The processor is also provided with a number of different inputs and outputs to facilitate user interaction with the processor and related devices. In this illustrative embodiment, a microphone 112, an auxiliary input 114 (for input 116), a USB interface 118 (for input/output 120), a GPS input 122, display screen 104, which may be a touchscreen display, and a BLUETOOTH pairing interface 124 are all provided. An input/output (I/O) selector 126 may be provided to facilitate user selection of a particular input/output for use. Input to both microphone 112 and auxiliary interface 114 may be converted from analog to digital signals by an associated A/D converter 128 before being communicated to the processor 106. Although not explicitly illustrated, vehicle components and auxiliary components in communication with the VCS may use a wired or wireless vehicle network (including, but not limited to, a CAN bus) to communicate signals representing data to and from the VCS (or components thereof). The VCS may also be connected to displays or HMI's associated with each passenger seating location or area to customize a particular seating location or area by controlling one or more accessories or components. Accessories or components may be controlled by the VCS in response to receiving a reservation for an associated seating location or area along with preferred settings. Alternatively, or in combination, a particular seating area or location may be controlled by a passenger in the vehicle using a personal nomadic device or mounted HMI after boarding.

System outputs may include, but are not limited to, a visual display 104 and speakers 130 or other stereo system output. In various embodiments, a visual display 104 may be provided for each passenger seating location or area and may be used to display passenger identification (name) and route information for boarding passengers. Alternatively, or in combination, another visual indicator, such as vehicle lighting associated with a particular seating location may illuminate in a particular color (green for example) or with a particular pattern to identify a reserved or assigned seating location or area for a boarding passenger.

Speakers 130 are connected to an amplifier 132 and receive signals from processor 106 through a digital-to-analog converter 134. Input and output signals may also be communicated via a remote BLUETOOTH device such as a personal navigation device (PND) 136, or a USB device, such as vehicle navigation device 138, along the bi-directional data streams generally represented at 140 and 120.

In one illustrative embodiment, system 100 uses a BLUETOOTH transceiver 150 to wirelessly communicate 152 with one or more personal mobile or nomadic devices 154 (e.g., cell phone, smart phone, PDA, smart watch or any other device having wireless remote network connectivity). Nomadic device 154 can then be used to communicate 156 with a network 158 outside vehicle 102 through, for example, communication 160 with a satellite or cellular tower 162. In some embodiments, cellular tower 162 or a similar tower or antenna may function as a WiFi access point. Likewise, vehicle 100 may communicate with a remote cloud server 166 over network 158 to exchange information with respect to occupancy status of a particular seating location or area and reservation information for a particular seating area or location. Reservation information may include passenger identification information, passenger route information (including pick-up and drop-off locations) and passenger accessory setting preferences, for example.

Nomadic device 154 may also be paired to vehicle 102 and communicate via BLUETOOTH or similar technology as represented by signal 164. Pairing of nomadic device 154 and BLUETOOTH transceiver 150 may be initiated by an associated button or interface 124, or similar input. Accordingly, CPU 106 pairs an onboard BLUETOOTH transceiver 152 with a BLUETOOTH transceiver in nomadic device 154.

Data may be communicated between CPU 106 and network 158 utilizing, for example, a data plan, data over voice, or DTMF tones associated with nomadic device 154. Alternatively, it may be desirable to include an onboard modem 170 having antenna 172 for communication 174 of data between CPU 106 and network 158 over the voice band. Nomadic device 154 may then be used for communication 156 with network 158 outside vehicle 102 through, for example, communication 160 with cellular tower 162. In some embodiments, modem 172 may establish communication 180 with tower 162 to communicate with network 158. As one example, modem 172 may be a USB cellular modem and communication 180 may be cellular communication.

In one illustrative embodiment, processor 106 is provided with an operating system including an API to communicate with modem application software. The modem application software may access an embedded module or firmware of BLUETOOTH transceiver 152 to complete wireless communication with a remote BLUETOOTH transceiver, such as that found in nomadic device 154, for example. BLUETOOTH is a subset of IEEE 802 PAN (personal area network) protocols. IEEE 802 LAN (local area network) protocols include WI-FI and have considerable cross-functionality with IEEE 802 PAN protocols. Both are suitable for wireless communication within a vehicle. Other communication technology may also be suitable for wired or wireless communications within the vehicle, such as free-space optical communication (IrDA, for example), non-standardized consumer infrared (IR) protocols, and the like.

In another embodiment, nomadic device 154 includes a modem for voice band or broadband data communication. In the data-over-voice embodiment, frequency division multiplexing may be implemented allowing the owner of the nomadic device to talk over the device while data is being transferred. At other times, when the owner is not using the device, the data transfer can use the entire available bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), and Space-Domain Multiple Access (SDMA) for digital cellular communication. These are all ITU IMT-2000 (3G) compliant standards and offer data rates up to 2 Mbps for stationary or walking users and 385 kbps for users in a moving vehicle. 3G standards are now being replaced by IMT-Advanced (4G) which offers 100 Mbps for users in a vehicle and 1 Gbps for stationary users. In another embodiment, nomadic device 154 is replaced with a cellular communication device (not shown) that is installed in vehicle 102. In other embodiments, nomadic device 154 may be implemented by a wireless local area network (LAN) device capable of communication over, for example (and without limitation), an 802.11g network (i.e., WI-FI) or a WIMAX network, for example.

In one embodiment, incoming data can be passed through nomadic device 154 through onboard BLUETOOTH transceiver 150 to processor 106. In the case of certain temporary data, for example, the data can be stored on HDD 110 or mobile device or other storage media until such time as the data is no longer needed. Temporary data may include various sensor data collected for a particular user, trip, route, etc. that may be communicated to one or more cloud-based services for use in determining passenger accessory settings, preferred seating location, frequently traveled routes, destinations, pick-up locations, etc. associated with a particular ride-sharing passenger. The temporary data may then be deleted or overwritten after communication to other computers within the network.

As previously described, various devices may interface with VCS 100, such as personal navigation device 136, having a USB connection 182 and/or an antenna 184, vehicle navigation device 138 having a USB connection 186 or other connection, onboard GPS device 122, or remote navigation system (not shown) having connectivity to network 158. As used herein, USB generally represents any of a variety of serial networking protocols that may include IEEE 1394 protocols referred to as FIREWIRE™ (Apple), i.LINK™ (Sony), and LYNX™ (Texas Instruments), EIA (Electronics Industry Association) serial protocols, IEEE 1284 (Centronics Port), S/PDIF (Sony/Philips Digital Interconnect Format) and USB-IF (USB Implementers Forum), which form the backbone of the device-device serial standards. Most of the protocols can be implemented for either electrical or optical communication.

As also shown in FIG. 1, processor 106 may communicate with various other types of auxiliary devices 190. These devices may be connected through a wireless connection/antenna 192 and/or a wired connection 194. Auxiliary devices 190 may include, but are not limited to, personal media players, wireless health devices, portable computers, and the like. Processor 106 may also be connected to a vehicle based wireless router 196, using for example a WI-FI (IEEE 803.11) transceiver 198. This could allow processor 106 to connect to remote networks in range of vehicle based wireless router 196.

In one embodiment, vehicle computing system 100 utilizes processor 106 and associated temporary and persistent memory RAM 108 and HDD 110, respectively to communicate with interior transceiver modules associated with different passenger seating areas as illustrated and described in greater detail with reference to FIGS. 2-4. Processor 106 may be programmed to detect occupancy status of each seating area based on signals from the modules, and to communicate the occupancy statuses to remote server 166 to facilitate scheduling of ride-sharing passengers for a specified seating area of the vehicle. Display 104 may be used in combination with one or more inputs and outputs, such as microphone 112, speaker 130, and/or nomadic device 154 functioning as a vehicle human-machine interface (HMI).

As previously described, system 100 may include a wireless transceiver, such as BLUETOOTH transceiver 152, modem 170, or router 196, for example, in communication with vehicle processor 106, which may be 106 further programmed to obtain information including a reserved seating location and associated preferred accessory settings for a scheduled passenger from a remote database of remote server 166 via network 158, for example.

Figure 2A:
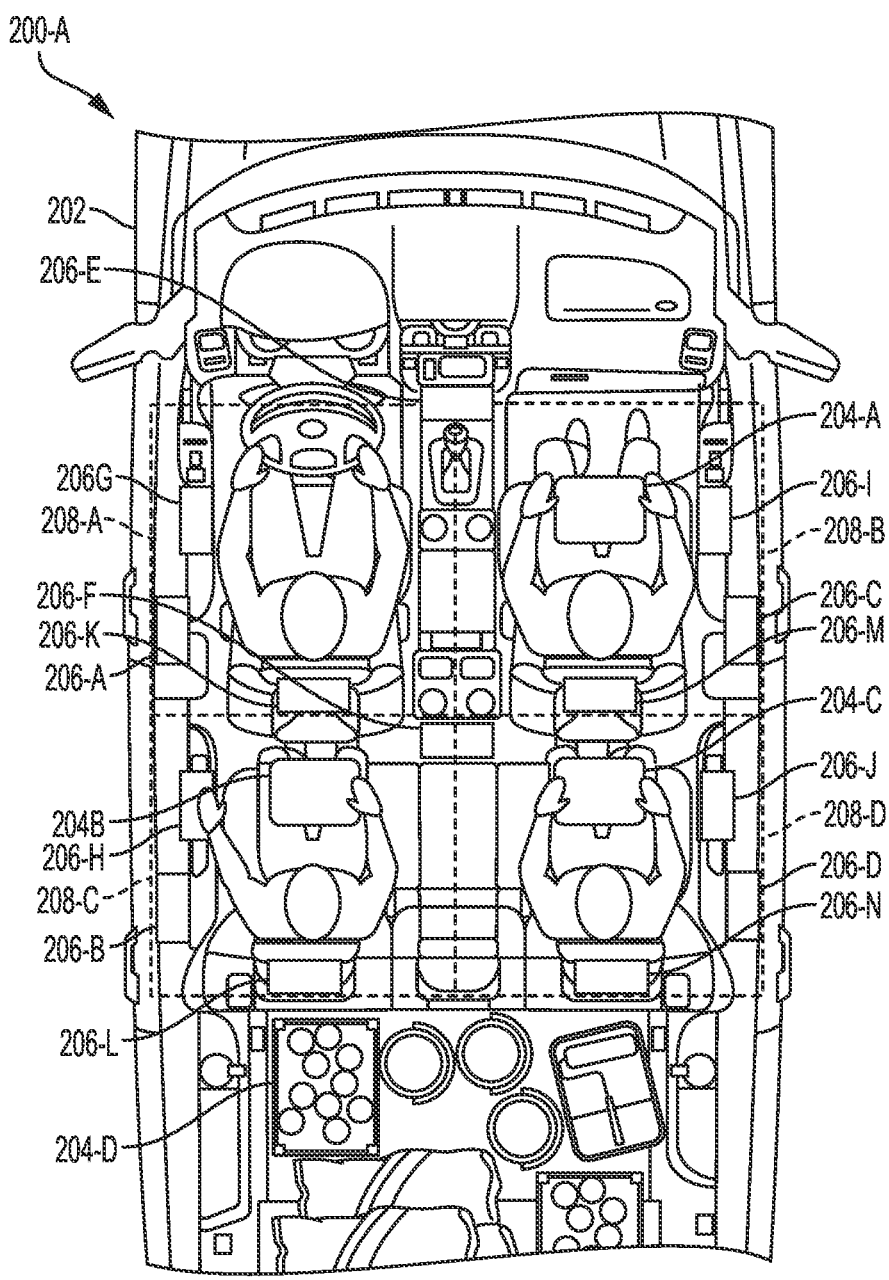
FIGS. 2A-2C is illustrates a ride-sharing vehicle having smart modules configured to communicate with mobile devices of passengers according to a representative embodiment.

FIG. 2A illustrates an example system 200 including a vehicle 202 having a mesh of in-vehicle components or smart modules 206 configured to locate and interact with users and personal devices 204 of the users. The system 200 may be configured to allow the users, such as vehicle occupants, to seamlessly interact with the in-vehicle components 206 in the vehicle 202 or with any other framework-enabled vehicle 202. Moreover, the interaction may be performed without requiring the personal devices 204 to have been paired with or be in communication with a head unit or other centralized computing platform of the vehicle 202.

The vehicle 202 may include various types of automobile, crossover utility vehicle (CUV), sport utility vehicle (SUV), truck, recreational vehicle (RV), boat, plane or other mobile machine for transporting people or goods. As the type and configuration of vehicle 202 may vary, the passenger seating locations, accessories, features, and capabilities of the vehicle 202 may correspondingly vary. As some other possibilities, vehicles 202 may have different capabilities with respect to passenger capacity, towing ability and capacity, and storage volume.

The personal devices 204-A, 204-B, 204-C, and 204-D (collectively 204) may include mobile devices of the users, wearable devices of the users, and/or luggage or cargo, for example. The mobile devices may be any of various types of portable computing device, such as cellular phones, tablet computers, smart watches, laptop computers, portable music players, or other devices capable of networked communication with other mobile devices. The wearable devices may include, as some non-limiting examples, smartwatches, smart glasses, fitness bands, control rings, or other personal mobility or accessory device designed to be worn and to communicate with the user's mobile device. Luggage or cargo may include RFID tags, BLE modules, or similar devices that may provide identification information when detected by one or more in-vehicle components or modules.

The in-vehicle components 206-A through 206-N (collectively 206) may include various elements of the vehicle 202 having user-configurable settings. These in-vehicle components 206 may include, as some examples, overhead light in-vehicle components 206-A through 206-D, climate control in-vehicle components 206-E and 206-F, seat control in-vehicle components 206-G through 206-J, and speaker in-vehicle components 206-K through 206-N. Other examples of in-vehicle components 206 are possible as well, such as rear seat entertainment screens or displays, seat heating, cooling, massage, lumbar supports, etc. or automated window shades, for example. In many cases, the in-vehicle component 206 may expose controls such as buttons, sliders, and touchscreens that may be used by the user to configure the particular settings of the in-vehicle component 206. As some possibilities, the controls of the in-vehicle component 206 may allow the user to set a lighting level of a light control, set a temperature of a climate control, set a volume and source of audio for a speaker, set a position of a seat, activate seat heating, cooling, massage, lumbar support, etc. In one embodiment, the VCS may control one or more in-vehicle components 206 in response to receiving a ride-sharing reservation for an assigned or reserved seating location with associated accessory or component setting preferences. The in-vehicle components or accessories may be controlled or actuated as the vehicle approaches a passenger pick-up location to customize the reserved seating location based on the passenger preferences prior to boarding the vehicle.

The vehicle 202 interior may be divided into multiple seating locations or zones 208, where each zone 208 may be associated with a seating position within the vehicle 202 interior. For instance, the front row of the illustrated vehicle 202 may include a first zone 208-A associated with the driver seating position, and a second zone 208-B associated with a front passenger seating position. The second row of the illustrated vehicle 202 may include a third zone 208-C associated with a driver-side rear seating position and a fourth zone 208-D associated with a passenger-side rear seating position. Variations on the number and arrangement of zones 208 are possible. For example, an alternate second row may include an additional fifth zone 208 of a second-row middle seating position (not shown). Four occupants are illustrated as being inside the example vehicle 202, three of whom are using personal devices 204. A driver occupant in the zone 208-A is not using a personal device 204. A front passenger occupant in the zone 208-B is using the personal device 204-A. A rear driver-side passenger occupant in the zone 208-C is using the personal device 204-B. A rear passenger-side passenger occupant in the zone 208-D is using the personal device 204-C. A zone may include two or more passenger seating locations depending on the particular vehicle configuration and availability of controllable in-vehicle components or accessories 206.

Each of the various in-vehicle components 206 present in the vehicle 202 interior may be associated with the one or more of the zones 208. As some examples, the in-vehicle components 206 may be associated with the zone 208 in which the respective in-vehicle component 206 is located and/or the one (or more) of the zones 208 that is controlled by the respective in-vehicle component 206. For instance, the light in-vehicle component 206-C accessible by the front passenger may be associated with the second zone 208-B, while the light in-vehicle component 206-D accessible by a rear passenger-side occupant may be associated with the fourth zone 208-D. It should be noted that the illustrated portion of the vehicle 202 in FIG. 2A is merely an example, and more, fewer, and/or differently located in-vehicle components 206 and zones 208 may be used.

Figure 2B:
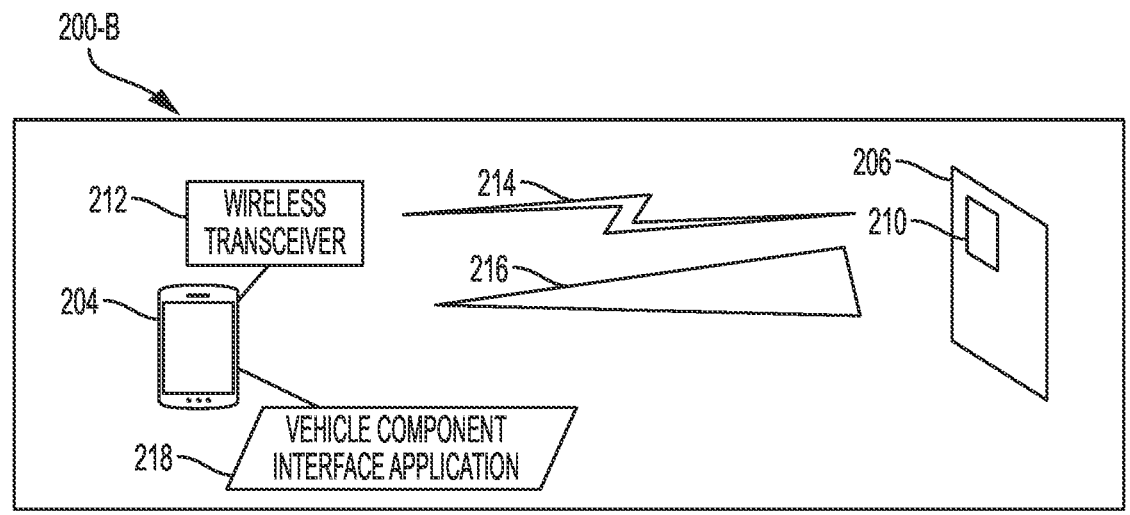

Referring to FIG. 2B, each in-vehicle component 206 may be equipped with a wireless transceiver 210 configured to facilitate detection of and identify proximity of the personal devices 204. Personal devices 204 may be located within the vehicle or exterior to the vehicle, such as when approaching a ride-sharing passenger pick-up location prior to the passenger boarding. In an example, the wireless transceiver 210 may include a wireless device, such as a BLUETOOTH Low Energy transceiver configured to enable low energy BLUETOOTH signal intensity as a locator, to determine the proximity of the personal devices 204. Detection of proximity of the personal device 204 by the wireless transceiver 210 may, in an example, cause a vehicle component interface application 218 of the detected personal device 204 to be activated.

In many examples the personal devices 204 may include a wireless transceiver 212 (e.g., a BLUETOOTH module, a ZIGBEE transceiver, a WI-FI transceiver, an IrDA transceiver, an RFID transceiver, etc.) configured to communicate with other compatible devices. In an example, the wireless transceiver 212 of the personal device 204 may communicate data with the wireless transceiver 210 of the in-vehicle component 206 over a wireless connection 214. In another example, a wireless transceiver 212 of a wearable personal device 204 may communicate data with a wireless transceiver 212 of a mobile personal device 204 over a wireless connection 214. The wireless connections 214 may be a BLUETOOTH Low Energy (BLE) connection, but other types of local wireless connection 214, such as Wi-Fi or ZIGBEE may be utilized as well.

The personal devices 204 may also include a device modem configured to facilitate communication of the personal devices 204 with other devices over a communications network. The communications network may provide communications services, such as packet-switched network services (e.g., Internet access, VoIP communication services), to devices connected to the communications network. An example of a communications network may include a cellular telephone network. To facilitate the communications over the communications network, personal devices 204 may be associated with unique device identifiers (e.g., mobile device numbers (MDNs), Internet protocol (IP) addresses, identifiers of the device modems, etc.) to identify the communications of the personal devices 204 over the communications network. These personal device 204 identifiers may also be utilized by the in-vehicle component 206 to identify the personal devices 204.

The vehicle component interface application 218 may be an application installed to the personal device 204 and may include various ride-sharing reservation features, such as storing preferred accessory settings, recently traveled routes, reserved vehicles, seating locations, etc. The vehicle component interface application 218 may be configured to facilitate vehicle occupant access to features of the in-vehicle components 206 exposed for networked configuration via the wireless transceiver 210. In some cases, the vehicle component interface application 218 may be configured to identify the available in-vehicle components 206, identify the available features and current settings of the identified in-vehicle components 206, and determine which of the available in-vehicle components 206 are within proximity to the vehicle occupant (e.g., in the same zone 208 as the location of the personal device 204). The vehicle component interface application 218 may be further configured to display a user interface descriptive of the available features, receive user input, and provide commands based on the user input to allow the user to control the features of the in-vehicle components 206. Thus, the system 200 may be configured to allow vehicle occupants to seamlessly interact with the in-vehicle components 206 in the vehicle 202, without requiring the personal devices 204 to have been paired with or be in communication with a head unit of the vehicle 202.

Each in-vehicle component 206 may also be equipped with a notification device 220 configured to facilitate identification of the physical location of the in-vehicle component 206 within the vehicle 202 by the occupants of the vehicle 202. The notification device 220 may be used to alert a boarding ride-sharing passenger of an available/reserved seating location. In one embodiment, notification device 220 may be used to display a passenger name and route or destination information based on reservation information received from a remote server 166. In one example, the notification device 220 may be a backlight of the in-vehicle component 206. In another example, the notification device 220 may utilize other features of the controls of the set of controls of the in-vehicle component 206 to perform the notification, such as existing lighting elements of the in-vehicle component 206. For example, lighting color, flashing pattern or similar visual indication may be used to indicate a reserved seating location. In yet a further example, the notification device 220 may utilize audio chimes or other sounds emanating from the in-vehicle component 206 to aid in the location of the in-vehicle component 206 and/or designate a particular seating location or position. In an even further example, the notification device 220 may utilize haptic feedback devices or tactile feedback devices to provide a physical indication to a user (e.g., to a user's hand) of the particular location of the in-vehicle component 206. It should also be noted that these approaches may be combined, and the notification device(s) 220 may perform more than one of the aforementioned or other notifications.

In one embodiment, the VCS may activate a visual indicator that is associated with a reserved passenger seating area in response to the vehicle approaching a pick-up location associated with the reserved passenger seating area. The vehicle location relative to the awaiting passenger may be determined by one or more of the in-vehicle components and associated transceivers, or by GPS positions of the passenger and vehicle. The GPS positions may be determined by the VCS alone or in combination with information provided by remote server 166.

The system 200 may use one or more device location-tracking techniques to identify the zone 208 in which the personal device 204 is located. Zones exterior to the vehicle may also be identified for use in aligning a vehicle stopping point with a passenger awaiting boarding, or aligning a luggage or cargo area, such as a trunk, hatchback, or back doors with a passenger awaiting boarding that has indicated luggage as part of the ride-sharing reservation. Location-tracking techniques may be classified depending on whether the estimate is based on proximity, angulation, or lateration. Proximity methods are "coarse-grained," and may provide information regarding whether a target is within a predefined range but they do not provide an exact location of the target. Angulation methods estimate a position of the target according to angles between the target and reference locations. Lateration provide an estimate of the target location, starting from available distances between target and references. The distance of the target from a reference can be obtained from a measurement of signal strength 216 over the wireless connection 214 between the wireless transceiver 210 of the in-vehicle component 206 and the wireless transceiver 212 of the personal device 204, or from a time measurement of either arrival (TOA) or difference of arrival (TDOA).

One of the advantages of lateration using signal strength 216 is that it can leverage the already-existing received signal strength indication (RSSI) information of signal strength 216 available in many communication protocols. For example, IBEACON uses the RSSI signal strength 216 information available in the BLUETOOTH Low-Energy (BLE) protocol to infer the distance of a beacon from a personal device 204 (i.e. a target), so that specific events can be triggered as the personal device 204 approaches the beacon. For example, a door associated with a passenger seating location reservation may be unlocked or opened, accessories may be controlled to passenger preferences, and a visual indicator may be activated to guide the awaiting passenger to a reserved/assigned seating location. Other implementations expand on the concept, leveraging multiple references to estimate the location of the target. When the distance from three reference beacons are known, the location can be estimated in full (trilateration) from the following equations:

$$d_1^2 = (x-x_1)^2 + (y-y_1)^2 + (z-z_1)^2$$

$$d_2^2 = (x-x_2)^2 + (y-y_2)^2 + (z-z_2)^2$$

$$d_3^2 = (x-x_3)^2 + (y-y_3)^2 + (z-z_3)^2 \qquad (1)$$

Figure 2C:
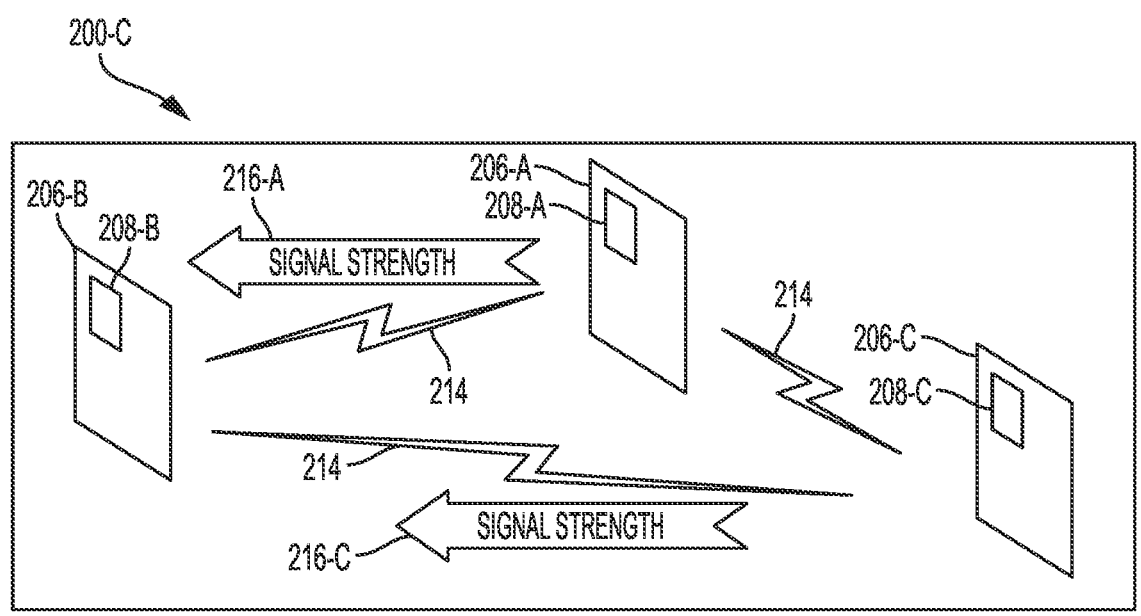

In an example, as shown in FIG. 2C, an in-vehicle component 206-B may broadcast or otherwise send a request for signal strength 216 to other in-vehicle components 206-A and 206-C of the vehicle 202. This request may cause the other in-vehicle components 206-A and 206-C to return wireless signal strength 216 data identified by their respective wireless transceiver 210 for whatever devices they detect (e.g., signal strength 216-A for the personal device 204 identified by the wireless transceiver 210-A, signal strength 216-C for the personal device 204 identified by the wireless transceiver 210-C). Using these signal strengths 216-A and 216-C, as well as signal strength 216-B determined by the in-vehicle component 206-B using its wireless transceiver 210-B, the in-vehicle component 206-B may use the equations (1) to perform trilateration and locate the personal device 204. As another possibility, the in-vehicle component 206 may identify the personal device 204 with the highest signal strength 216 at the in-vehicle component 206 as being the personal device 204 within the zone 208 as follows:

$$\text{Personal Device} = i \Rightarrow \max_{i=1,n} RSSI_i \quad (5)$$

Thus, the mesh of in-vehicle components 206 and the personal devices 204 may accordingly be utilized to allow the in-vehicle components 206 to identify in which zone 208 each personal device 204 is located. Alternatively, components 206 may communicate associated signal information to another vehicle processor that may determine a location of a personal device 204 relative to one or more vehicle zones 208 for use in aligning a seating zone with a boarding or departing passenger.

As yet another possibility for locating of the personal device 204 relative to vehicle 202, signal strengths 216 of the personal device 204 to each of the in-vehicle components 206 of a particular zone 208 may be used to determine whether the personal device 204 is associated with that zone 208. Association with a zone may also indicate whether the personal device is inside or outside of the vehicle. As yet a further possibility for locating of the personal device 204 relative to the vehicle 202, symmetrical sets of in-vehicle components 206 with a symmetrical vehicle cabin may be utilized to estimate the location of the personal device 204.

Regardless of the particular approach that is used, the mesh of in-vehicle components 206 and the personal devices 204 may be utilized to allow the in-vehicle components 206 to identify personal devices 204 associated with a particular zone 208. As each of the in-vehicle components 206 is also associated with a zone 208, the in-vehicle components 206 may accordingly identify the personal device 204 to be notified as being the personal device 204 that is associated with the same zone 208 with which the in-vehicle component 206 is associated.

As one possibility, the in-vehicle component 206 may utilize signal strength data 216 received from the personal devices 204 in the vehicle 202 to identify which of the personal devices 204 is in use by the occupant physically interacting with the seating controls in-vehicle component 206-H. For instance, identifying the personal device 204 with the highest signal strength 216 at the in-vehicle component 206 would likely identify the correct personal device 204, e.g., as follows:

$$\text{Personal Device} = i \Rightarrow \max_{i=1,n} RSSI_i \quad (5)$$

In one embodiment, a personal device 204 associated with a particular zone 208 and therefore an associated passenger may be used to communicate passenger specific data to a ride-sharing passenger. For example, an alert may be provided to a particular passenger associated with a seating zone 208 as the vehicle is approaching the drop-off location for the passenger. Similarly, information such as current traffic alerts or a time-to-destination may be provided for each passenger via one or more designated personal devices 204 associated with a particular passenger.

Figure 3A:
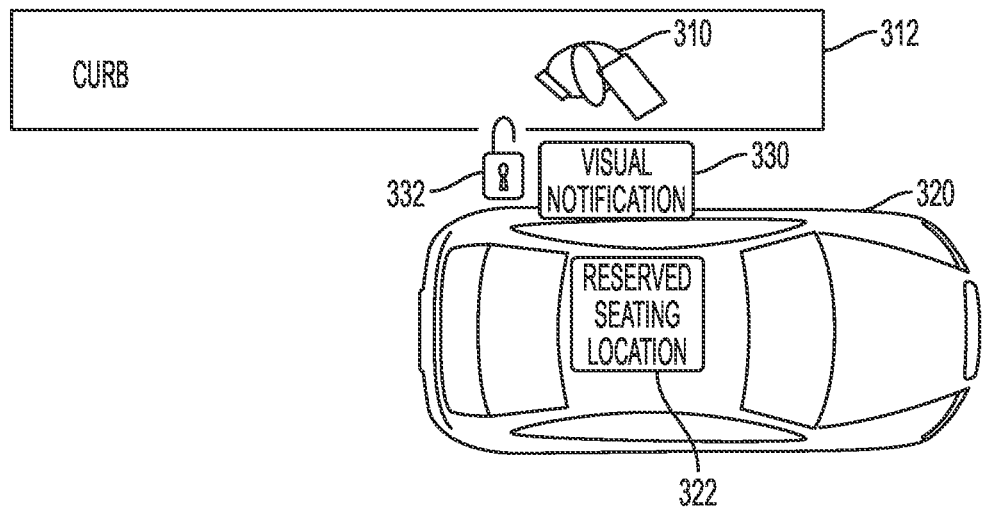
FIGS. 3A-3B illustrate alignment of a ride-sharing vehicle with a boarding passenger based on reserved seating location and detected luggage according to representative embodiments.
Figure 3B:
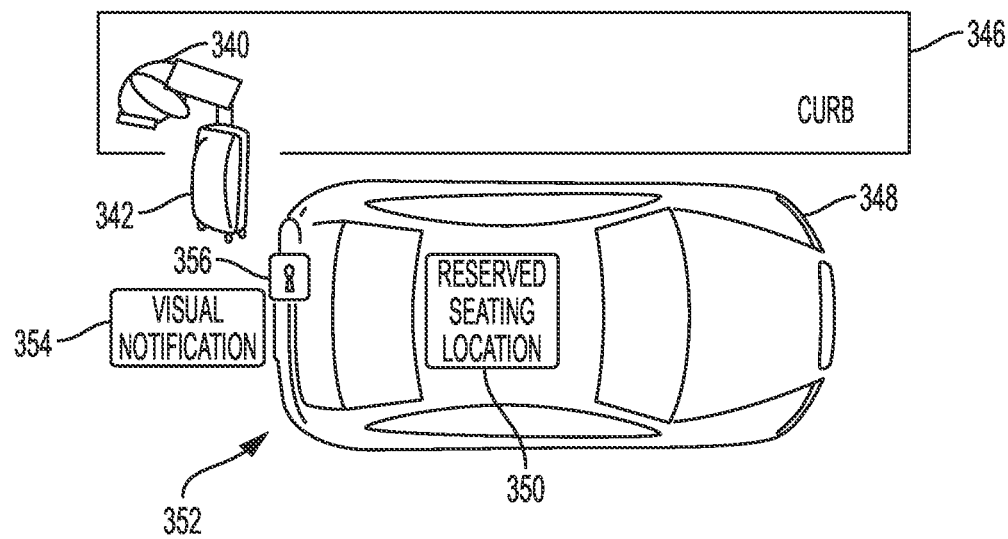

FIGS. 3A-3B illustrate alignment of a ride-sharing vehicle with a boarding passenger based on a reserved seating location and detected luggage according to representative embodiments. As illustrated in FIG. 3A, passenger 310 is on a curb 312 at a reserved or scheduled pick-up location by vehicle 320. A reserved seating location 322 has been previously communicated to vehicle 320 by a remote server. As previously described, the ride-sharing reservation may also indicate that the passenger 310 does not have any luggage, would like to be picked-up at a particular location and time, and would like to customize available vehicle component or accessory settings associated with reserved seating location 322. As vehicle 320 approaches passenger 310, the in-vehicle components may detect a personal device of passenger 310 as previously described and provide a visual indication 330 and unlock 332 an associated passenger door in anticipation of passenger boarding associated with reserved seating location 322. Unlocking 332 may require an encrypted or secure handshake between the VCS of vehicle 320 and a personal device of passenger 310 in some embodiments. Vehicle 320 may align reserved seating location 322 with awaiting passenger 310 based on detecting the location of passenger by in-vehicle components or via coordinates provided by a passenger mobile device communicated directly to vehicle 320 or via a remote server. Autonomous vehicles may be controlled automatically. Driver-operated vehicles may provide visual or audio navigation instructions to the driver to assist in aligning the reserved seating location 322 with passenger 310.

FIG. 3B illustrates alignment of a vehicle luggage or cargo area with an awaiting passenger associated with a reserved seating location. Passenger 340 is waiting with cargo or luggage 342 on curb 346 at a location specified in the ride-sharing reservation and communicated to vehicle 348 directly or via a remote server. Passenger 340 may specify cargo or luggage 342 at the time of reservation. Alternatively, vehicle 348 may detect luggage 342 upon arrival for luggage having communication or tracking capabilities as previously described. Passenger 340 has a reserved seating location 350. However, vehicle 348 aligns a cargo or luggage area 352 with passenger 340 while providing a visual indication 354 and unlocking 356 luggage area 352 upon arrival at the passenger location associated with reserved seating location 350.

Figure 4:
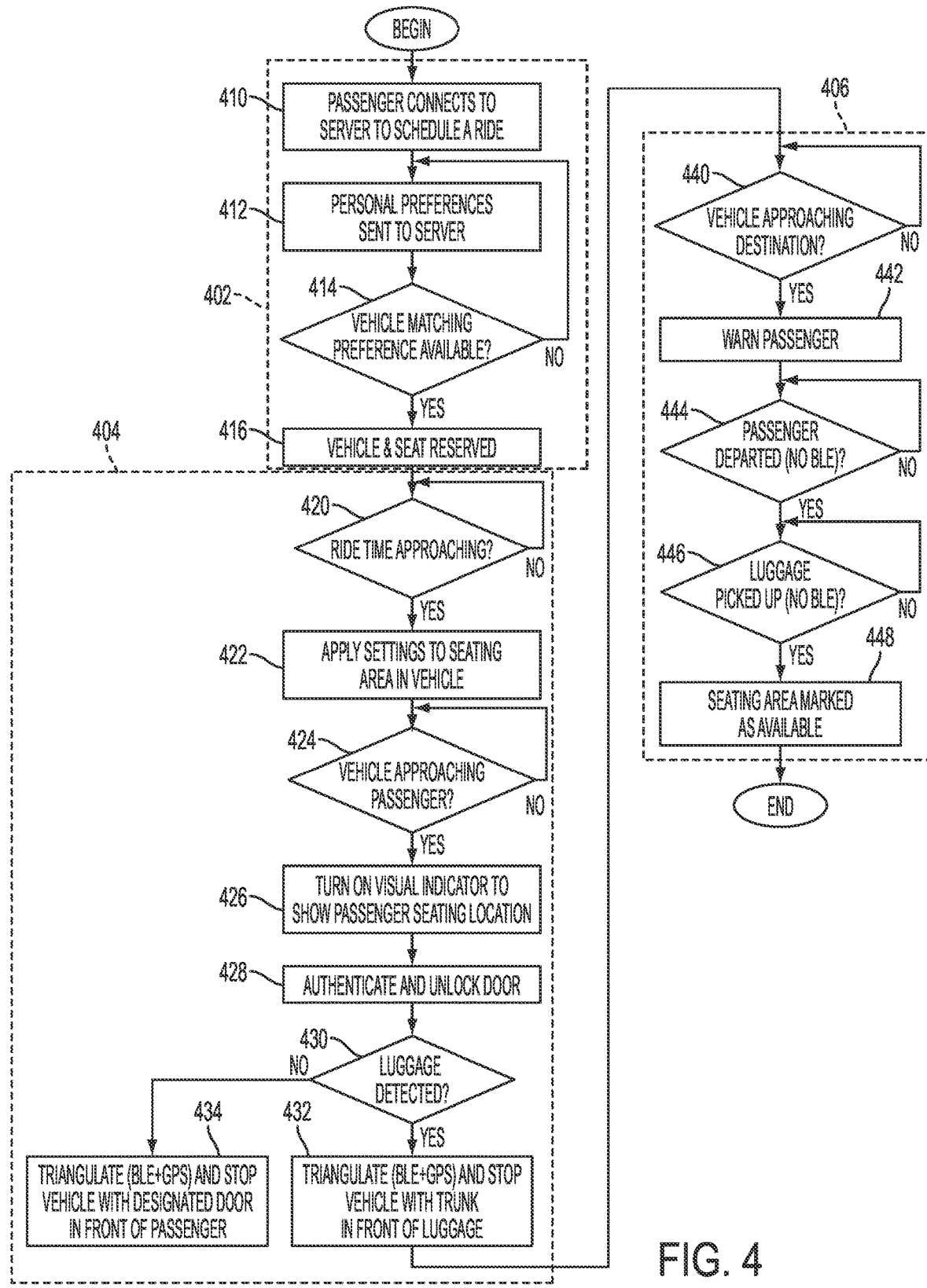
FIG. 4 is a flowchart illustrating operation of a system or method for vehicle ride-sharing according to various embodiments.

FIG. 4 is a flowchart illustrating operation of a system or method for vehicle ride-sharing according to various embodiments. As previously described, various functions or processes illustrated may be performed in a different order, may be omitted, or may be repeatedly performed although not explicitly illustrated or described to accomplish the various features and advantages described herein as those of ordinary skill in the art will understand. Operation of a system or method for ride-sharing with reservation of a specified seating location and control of vehicle accessories associated with a reserved seating location based on a passenger reservation according to various embodiments of the disclosure may include reservation or scheduling of a ride as indicated at 402, passenger pick-up as indicated at 404, and passenger drop-off as indicated at 406, for example.

Scheduling of a ride-sharing event 402 may include a passenger connecting to a remote server to schedule a ride as represented at 410. The passenger may indicate personal preferences for seating location and associated available accessory or component settings as indicated at 412. Reservation or scheduling may also include a desired pick-up location and time, destination location and/or arrival time, type of vehicle, driver rating, etc. The remote server may compare the requested reservation parameters with available ride-sharing vehicles to determine a matching vehicle preference as represented at 414. One or more available options may be presented to the user for selection based on partial or complete matches. If there are no matching vehicles, the process may return to step 412 for the user to modify preference settings. The user may select a matching vehicle and reserve a seat as represented at 416. The system or method then continues with passenger pickup as represented by blocks 404.

Passenger pick-up may include detecting a scheduled ride or pick-up time as represented by block 420. One or more in-vehicle components or accessories may be controlled based on preferences associated with a specified reserved seating area or location as represented at 422 based on an approaching ride pick-up time and/or current vehicle location relative to a scheduled passenger pick-up location. Various accessories may be controlled based on the estimated time prior to passenger pick-up and the estimated time for a particular accessory to attain a desired passenger preference setting. For example, a seat heater may be activated several minutes prior to an estimated pick-up time so that the seat reaches a set-point temperature prior to boarding while ambient lighting may be activated upon imminent approach to a passenger location or upon detecting a passenger boarding because it may attain a desired setting nearly instantaneously.

As the vehicle approaches a scheduled pick-up location or passenger as represented at 424, a visual indicator may be actuated as represented at 426 to guide the passenger to the reserved/assigned seating location. One or more in-vehicle modules may attempt to communicate with a passenger personal nomadic device to detect passenger position relative to the vehicle and/or to perform a secure authentication and unlock an associated door as represented at 428. Detected passenger position relative to the vehicle may be used to align the reserved seating location with the passenger as the vehicle approaches and stops at the pick-up location. If luggage has been indicated in the reservation or is detected by one or more vehicle components or transceivers as indicated at 430, the vehicle may stop with the trunk or other cargo area aligned with the passenger or luggage as indicated at 432. Otherwise, the vehicle may be stopped with a vehicle door or access point for the reserved seating location aligned with the awaiting passenger as represented at 434.

The system or method may include ride-sharing passenger drop-off as generally represented at 406. As the vehicle approaches a destination associated with a particular vehicle seating area or location as represented at 440, a passenger message or alert may be provided as represented at 442. This may include sending a message to a passenger personal device, changing ambient lighting, providing an audible alert, displaying a message on a vehicle-mounted display, etc. depending on the particular vehicle and implementation. The vehicle may detect passenger departure as represented at 444 and determine whether associated tracking-enabled luggage has been removed as represented at 446. In response to passenger departure, the vehicle may communicate the occupancy status of the seating area or position as available to the remote server as indicated at 448.

As those of ordinary skill in the art will appreciate, various embodiments according to the present disclosure as described above may provide an integrated ride-sharing system and method with features for both operator-driven and autonomous vehicles, such as determining approach, boarding, and departure of passengers, reserving a particular seating location for a passenger, and providing signaling or alerts to indicate assigned/reserved seating locations, for example. Passenger preferences for vehicle equipment or feature settings may be scheduled/reserved for a particular vehicle and transmitted to the booked vehicle for customized seating location settings prior to boarding the vehicle by the passenger. Luggage or cargo may be detected or scheduled with the vehicle arrival location or stopping point aligned with a cargo area for loading of luggage, or boarding a passenger. A passenger mobile device or in-vehicle display may be used to provide alerts or notifications of an approaching destination and presence of passenger luggage in the vehicle.

While representative embodiments are described above, it is not intended that these embodiments describe all possible forms of the claimed subject matter. Rather, the words used in the specification are words of description rather than limitation, and it is understood that various changes may be made without departing from the spirit and scope of the disclosure. Additionally, the features of various implementing embodiments may be combined to form further embodiments that are not explicitly described or illustrated. While various embodiments may have been described as providing advantages or being preferred over other embodiments or prior art implementations with respect to one or more desired characteristics, as one of ordinary skill in the art is aware, one or more features or characteristics may be compromised to achieve desired overall system attributes, which depend on the specific application and implementation. These attributes include, but are not limited to: cost, strength, durability, life cycle cost, marketability, appearance, packaging, size, serviceability, weight, manufacturability, ease of assembly, etc. Embodiments described as less desirable than other embodiments or prior art implementations with respect to one or more characteristics are not necessarily outside the scope of the disclosure and may be desirable for particular applications.

What is claimed:

1. A computing system comprising:
one or more processors; and
a memory storing instructions that, when executed by the one or more processors, cause the computing system to:
receive a transport reservation request comprising a pick-up location, a destination, and one or more transportation preferences of a next passenger, wherein the one or more transportation preferences comprise at least one of a vehicle equipment preference, a seating location preference, and a luggage preference of the next passenger, the luggage preference indicative of whether the next passenger intends to transport luggage;
receive, from a vehicle comprising an autonomous vehicle (AV), first data indicative of occupant location within the vehicle, the first data based on signals received from a first mobile device of a first passenger inside the vehicle;
based on the transport reservation request and the first data, match the next passenger to the vehicle;
based on a position of the first passenger within the vehicle, transmit second data indicative of the pick-up location such that an open seat within the vehicle is adjacent to the next passenger at the pick-up location or, if the one or more transportation preferences comprise the luggage preference indicating that the next passenger intends to transport luggage, such that a cargo area of the vehicle is adjacent to the next passenger at the pick-up location, wherein the second data is configured to cause the computing system of the AV to autonomously operate control mechanisms of the AV in order to position the open seat or the cargo area of the vehicle adjacent to the next passenger at the pick-up location.

2. The computing system of claim 1, wherein the first data is based on BLUETOOTH® signals.

3. The computing system of claim 1, wherein the first data is based on accelerometer data.

4. The computing system of claim 1, wherein the computing system is further configured to:
transmit seat location data to a second mobile device of the next passenger, the seat location data causing the second mobile device of the next passenger to present a seat location within the vehicle.

5. The computing system of claim 1, wherein the instructions to match the next passenger to the vehicle comprise instructions to match the next passenger to the vehicle based on one or more user preferences of the next passenger.

6. The computing system of claim 1, wherein the instructions to match the next passenger to the vehicle includes instruction to match the next passenger to the vehicle based on a seat of the vehicle corresponding to the one or more transportation preferences of the next passenger being available.

7. The computing system of claim 1, wherein the second data comprises route information that is configured to be presented by a device within the vehicle.

8. The computing system of claim 1, wherein the computing system is further configured to:
cause transmission of a notification to the second mobile device of the next passenger prior to pick-up.

9. The computing system of claim 1, wherein the computing system is further configured to:
determine movement of the first passenger within the vehicle.

10. A vehicle carpooling system, comprising:
at least one processor and a memory in communication with one or more of the at least one processor, the at least one processor configured to:
determine an occupancy status of a vehicle, wherein the occupancy status includes a first seat occupied by a first passenger in the vehicle;
send occupancy status data to facilitate scheduling of a next passenger for the vehicle;
receive an indication of a ride match of a second passenger to a second seat in the vehicle, wherein the ride match is based on the occupancy status data and a pick-up location, a destination, and one or more transportation preferences of the second passenger, the one or more transportation preferences comprising at least one of a vehicle equipment preference, a seating location preference, and a luggage reference of the second passenger, the luggage preference indicative of whether the second passenger intends to transport luggage;
receive location data indicating the pick-up location for the second passenger;
autonomously position the vehicle to align a door of the vehicle associated with the second seat with the position of the second passenger at the pick-up location, or, if the one or more transportation preferences comprise the luggage preference indicating that the second passenger intends to transport luggage, to align a door of the vehicle associated with a cargo area of the vehicle with the position of the second passenger at the pick-up location.

11. The vehicle carpool system of claim 10, wherein the processor is further configured to cause display of route information associated with the pick up location data.

12. The vehicle carpool system of claim 10, wherein the processor is further configured to determine movement of the first passenger within the vehicle.

13. The vehicle carpool system of claim 10, wherein the processor is further configured to receive signals indicative of position from the first passenger within the vehicle.

14. The vehicle carpool system of claim 13, wherein the signals indicative of position are based on at least one of BLUETOOTH® signals or accelerometer data.

15. The vehicle carpool system of claim 10, wherein the processor is further configured to cause seat assignment data to be transmitted to a mobile device of the second passenger.

16. The vehicle carpool system of claim 10, wherein the processor is further configured to cause an indication of a seat assignment to be presented.

17. The vehicle carpool system of claim 10, wherein the location data comprises route information that is configured to be presented within the vehicle.

18. The vehicle carpool system of claim 10, wherein the processor is further configured to:
cause transmission of a message to a mobile device of the next passenger prior to pick up.

* * * * *